United States Patent [19]

Ovadia

[11] Patent Number: 5,331,135
[45] Date of Patent: Jul. 19, 1994

[54] MICROWAVE BAKING PAN

[75] Inventor: David Ovadia, Manhattan, Kans.

[73] Assignee: Kansas State University Research Foundation, Manhattan, Kans.

[21] Appl. No.: 17,014

[22] Filed: Feb. 12, 1993

[51] Int. Cl.⁵ .............................................. H05B 6/80
[52] U.S. Cl. .................... 219/728; 219/733; 99/DIG. 14; 426/234; 426/243
[58] Field of Search ............... 219/10.55 E, 10.55 F, 219/10.55 D, 728, 729, 733, 734, 735; 99/DIG. 14; 426/107, 109, 234, 241, 243

[56] References Cited

U.S. PATENT DOCUMENTS

| | | | |
|---|---|---|---|
| 3,219,460 | 11/1965 | Brown | 219/10.55 E |
| 3,302,632 | 2/1967 | Fichtner . | |
| 3,615,713 | 10/1971 | Stevenson . | |
| 3,845,266 | 10/1974 | Derby . | |
| 3,857,009 | 12/1974 | MacMaster et al. . | |
| 4,013,798 | 3/1977 | Goltsos | 219/10.55 E |
| 4,196,331 | 7/1978 | Leveckis et al. . | |
| 4,268,738 | 5/1981 | Flautt, Jr. et al. | 219/10.55 F |
| 4,271,203 | 6/1981 | Schiffmann et al. . | |
| 4,283,427 | 8/1981 | Winters et al. . | |
| 4,318,931 | 3/1982 | Schiffmann et al. . | |
| 4,343,978 | 8/1982 | Kubiatowicz | 219/10.55 E |
| 4,499,356 | 2/1985 | Hatagawa | 219/10.55 F |
| 4,641,005 | 2/1987 | Seiferth . | |
| 4,689,458 | 8/1987 | Levendusky et al. | 219/10.55 E |
| 4,703,148 | 10/1987 | Mikulski et al. | 219/10.55 E |
| 4,801,017 | 1/1989 | Artusi | 219/10.55 E |
| 4,927,991 | 5/1990 | Wendt et al. . | |
| 4,940,869 | 7/1990 | Scholtes et al. . | |
| 4,948,932 | 8/1990 | Clough . | |
| 5,117,078 | 5/1992 | Beckett . | |

FOREIGN PATENT DOCUMENTS 1538851 1/1979 United Kingdom .

OTHER PUBLICATIONS

ACS Symposium Series 473; Food and Packaging Interactions II; Chapter 3, Food and Drug Administration Studies of High-Temperature Food Packaging; Henry C. Hollifield.
Bakery Digest-Feb. 1982; David C. T. Pei, "Microwave Baking-New Developments-" pp. 8, 10 and 32. See the attached FIGS. 1-8.

*Primary Examiner*—Philip H. Leung
*Attorney, Agent, or Firm*—Hovey, Williams, Timmons & Collins

[57] ABSTRACT

An improved baking pan (10) for short-time combination baking is provided which allows baking of bread or other comestible products using both conventional heating and microwave or rf energy. The pan (10) preferably includes a bottom wall (12) and upstanding sidewall structure (14) which are provided with apertures (26, 28) sized to permit passage of microwave or rf energy therethrough. A liner (34) is positioned within the pan (10) in covering relationship to the apertures (26, 28), so as to prevent passage of uncooked dough or the like through the pan apertures (26, 28), while being sufficiently thin to not appreciably decrease thermal conductivity through the pan walls (12, 14). Combination bread baking using the pan (10) typically involves conventional heating to a temperature of from about 430°-625° F., with simultaneous application of microwave energy. Provision of the apertures (26, 28) allows even microwave or rf cooking of the interior of the loaf, while the metallic pan walls (10, 14) assure rapid and even browning and crust formation.

18 Claims, 1 Drawing Sheet

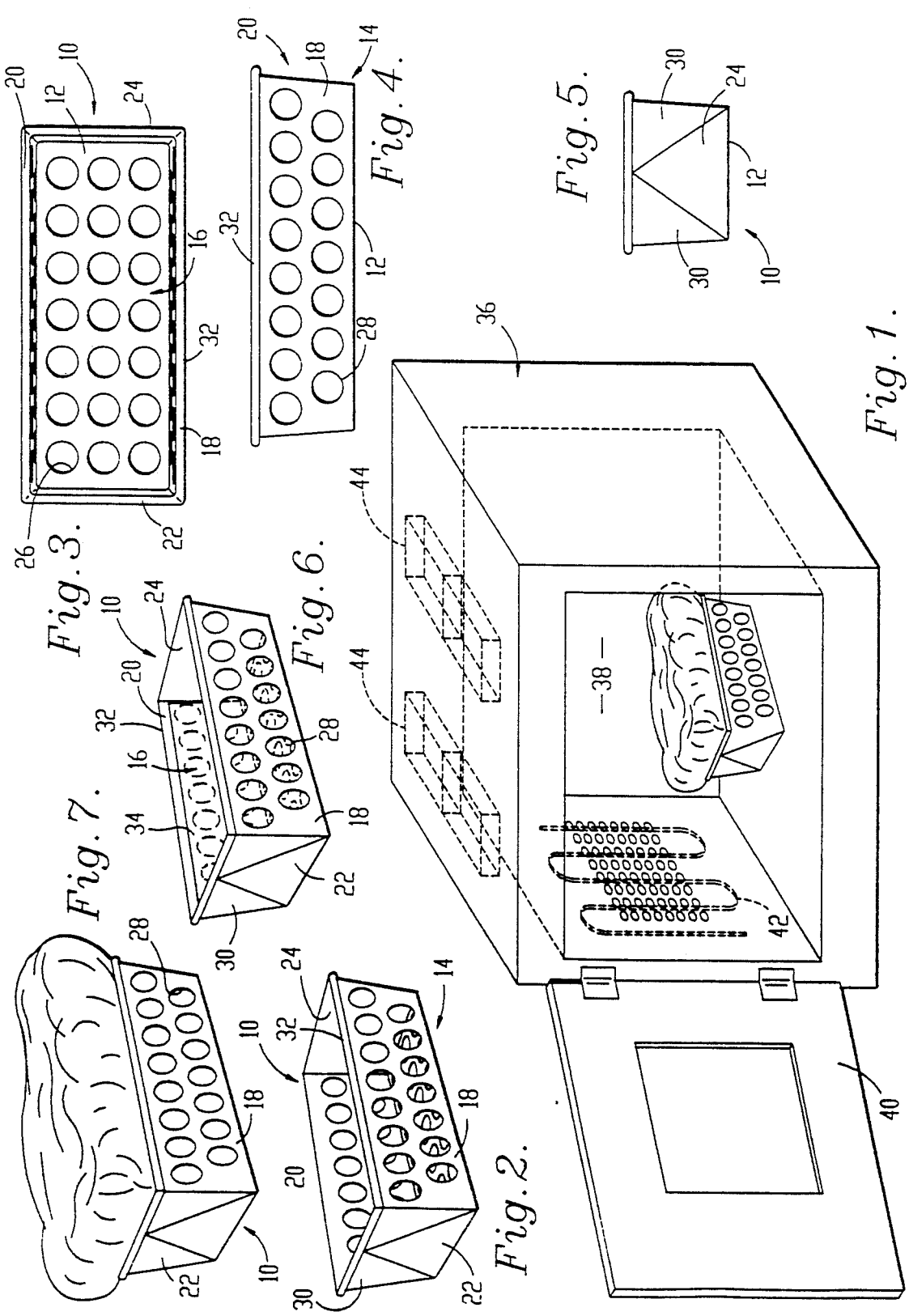

MICROWAVE BAKING PAN

BACKGROUND OF THE INVENTION

1. Field of the Invention

The present invention is broadly concerned with an improved metallic baking pan particularly suited for combination baking of bread or other comestible products wherein a dough or batter is subjected to both conventional convection heating and microwave or rf radiation. More particularly, the invention pertains to a baking pan of this character, together with the combination baking method employing the pan, wherein the bottom and sidewall structure of the pan is apertured to permit entrance of microwave or rf radiation; in this fashion, crust formation can occur in the usual manner, while the microwave or rf radiation serves to completely bake the interior of the product. Properly sized and oriented apertures in the baking pan permit reduction in baking times, while nevertheless producing fully acceptable, baked final products.

2. Description of the Prior Art

The baking of bread or other food items may be thought of as an operation involving two very different physical reactions, occurring simultaneously. In the interior of a dough or batter, a number of physical and chemical changes occur that in their entirety can be described as cooking or gelatinization. Heat is required for these reactions, and they vary greatly depending upon the ingredients in the dough or batter. Simultaneously, a drying and crisping effect occurs on the surface of the product, leading to browning and crusting. Time honored baking processes involving differing time-temperature conditions have been developed for various types of final products, in order to create an effective matching of the complex simultaneous changes occurring during baking.

It has been suggested in the past to employ microwave or longer wavelength rf energy for baking purposes. The advantages of microwave use include lower utility costs, as well as reduced baking times. While in theory microwave baking is advantageous, on a practical level significant problems occur. For example, where microwave energy is used for bread baking, very little if any brown crust is formed, unless the baking operation is continued for relatively long periods, which effectively overcooks the interior of the bread. In short, microwave baking upsets the normal simultaneity of interior cooking and crust formation crucial to production of acceptable bread. Additionally, where metal baking pans are employed, the microwave energy can generally penetrate only from the open top of the pans, while being reflected from the metal pan walls. As a consequence, the top of the bread tends to overbake, while the interior and bottom part of the loaf is underbaked. Where use is made of glass or ceramic pans which are transparent to microwave energy, the crust is very pale, thin, wet and structurally weak.

It has also been suggested in the past to employ both conventional and microwave heating for baking purposes. This has been done simultaneously or serially, i.e., first applying microwave energy to obtain oven spring and setting of the bread structure, with subsequent finish baking using conventional heating to obtain crusting. Work that involved use of glass-type pans ("Pyrex" or "Corning Ware") was characterized by excessive collapse due to poor sidewall formation. Other work that involved baking in metal pans about 2-4 inches deep did not address the problems of poor penetration by 2450 MHz microwaves to the bottom of the dough, and excessive baking of the top.

The browning or crusting problem has also been addressed in the prior art through the use of microwave susceptors. These devices are generally made up of paper or synthetic resin substrates which are coated with a very thin metallic layer. This layer is intended to rapidly heat and reflect energy to the adjacent food surface, thereby browning the product. However, susceptors are prone to degradation at high temperatures, and can evolve dangerous or poisonous byproducts as a result. Furthermore, susceptors do not in practice give browning equivalent to that obtained when using conventional metallic baking pans.

There is accordingly a real and unsatisfied need in the art for an improved baking pan and method which combines the attributes of conventional metal baking pans while also permitting reduced time combination baking wherein the simultaneous processes of internal cooking and crust formation are properly coordinated.

SUMMARY OF THE INVENTION

The present invention overcomes the problems outlined above and provides an improved baking pan in the form of a metallic body presenting a bottom wall, upstanding, interconnected sidewall structure connected with the bottom wall and defining a cavity for receiving dough or the like to b baked. The bottom wall and sidewall structure are each provided with a series of apertures therethrough dimensions for permitting passage of microwave or rf energy into the interior of a dough or batter for baking purposes. Each of the bottom wall and sidewall structures has a total open area defined by the apertures therethrough which is at least about 20% of the total interior surface area of the respective bottom wall or sidewall structure. The sidewall structure moreover has a height of from about 2-4 inches, and the bottom wall and sidewall structure should have a metal thickness of at least 0.07 mm for disposable pans and at least about 0.25 mm for reusable pans.

In preferred forms, the apertures are substantially circular and have a diameter of from about 15-35 mm, and most preferably from about 20-30 min. The total open area of the bottom wall and sidewall structures is advantageously from about 20-90% of the interior surface area of the corresponding bottom wall or sidewall structure; and the metal thickness of these walls should broadly be from about 0.08-0.1 mm, with preferred ranges of from about 0.08-0.12 mm for disposable pans, and from about 0.27-1 mm for reusable pans. It will be understood that the selected metal thickness is dependent on the type of metal (aluminum, steel, tin, etc.) employed and the intended use (e.g., thicker, more rugged pans for industrial use, and thinner walled pans for domestic use). In order to achieve the best possible crust formation, the pan should be formed entirely of metal, and should present metallic inner and outer faces.

The baking pans can be of any desired shape, such as open-top, rectangular bread pans. In such a case, the sidewall structure presents a pair of opposed, generally planar, apertured sidewalls with a pair of opposed, generally planar, imperforate end walls.

In use, a liner is first disposed within the cavity presented by the pan in covering relationship to the apertures in order to prevent escape of dough or the like from the pan. The liner must permit passage of microwave or rf radiation therethrough while, at the same time, not significantly reducing good thermal conductivity through the pan walls, needed for crust formation. To this end, the liner is normally very thin, typically 0.07 mm. The liner can be temporary and disposable and preferably is formed from conventional baking paper. According to another embodiment of the invention, the liner can be a permanent and reusable thin layer of ceramic or toughened glass material internally covering the pan wall apertures.

After the liner is in place, an amount of dough or the like is deposited within the lined cavity of the pan and combination baking is carried out. This involves heating in an oven using any conventional heating means (e.g., electrical resistance coils), along with simultaneous microwave or rf cooking. The conventional heating is advantageously carried out at a relatively high temperature of from about 430°-625° F., in order to achieve browning or crusting in correlation with interior cooking from the application of microwave or rf energy. In alternate forms, the combination cooking can be done sequentially. Although any desired effective frequency of microwave energy may be employed, the most typical frequency of about 2450 MHz is normally employed.

BRIEF DESCRIPTION OF THE DRAWINGS

FIG. 1 is an isometric view of a bread baking pan in accordance with the invention situated within a combination electric/microwave oven and holding a completed, combination baked loaf of bread therein;

FIG. 2 is an isometric view of the preferred metallic bread baking pan of the invention;

FIG. 3 is a plan view of the pan illustrated in FIG. 2;

FIG. 4 is a side elevational view of the pan depicted in FIGS. 2-3;

FIG. 5 is an end view of the pan shown in FIGS. 2-4;

FIG. 6 is an isometric view similar to that of FIG. 1, but illustrating placement of a microwave-transparent baking paper liner within the cavity of the pan in covering relationship to the sidewall and bottom wall apertures; and FIG. 7 is a view illustrating a completed, combination baked loaf within the pan of FIGS. 2-6.

DETAILED DESCRIPTION OF THE PREFERRED EMBODIMENTS

Turning now to the drawings, and particularly FIGS. 2-5, a baking pan 10 in accordance with the invention is illustrated. The pan 10 includes a bottom wall 12 as well as upstanding sidewall structure 14 integral with bottom wall 10 and cooperatively defining an inner, rectangular in plan cavity 16.

The sidewall structure 14 in the illustrated embodiment includes a pair of opposed, generally planar, slightly outwardly diverging sidewalls 18, 20 together with opposed end walls 22, 24 which are transverse to the sidewalls 18, 20 and mutually divergent as illustrated. All of the defining walls 12 and 18-24 are formed entirely of metal having a preferred thickness of about 0.56 mm and present metallic inner and outer faces.

Bottom wall 12 (see FIG. 3) is provided with a plurality of spaced apart circular apertures 26 therethrough having a diameter of about 24 mm. Of course, other opening shapes can also be employed, so long as the bottom wall has sufficient open area as defined previously for admission of microwave or rf energy.

The sidewalls 18, 20 are likewise provided with a series of apertures 28 therethrough, which again are circular and have a diameter of about 24 mm. As in the case of bottom wall 12, the sidewall apertures 28 can assume a variety of different shapes, so long as the open area requirements for adequate passage of microwave or rf energy are observed. As best seen in FIGS. 2, 5 and 6, the end walls 22, 24 are imperforate, and have metallic reinforcing segments 30.

The upper margins of the sidewalls 18, 20 and end walls 22, 24 are also configured to present a continuous, rounded, uppermost lip 32 which houses an internal cylindrical reinforcing rod (not shown).

FIG. 6 illustrates the pan 10 with a baking paper liner 34 therein. This liner is in the form of a rectangular sheet of baking paper folded to present a bottom panel covering the apertures 26, with upstanding side marginal panels respectively covering the apertures 28 provided through the sidewalls 18, 20. It will be understood in this respect that the liner 34 is placed within the pan 10 prior to depositing dough or the like within the pan, in order to prevent escape of this material through the apertures 26, 28.

In baking operations, an appropriate quantity of dough or batter is placed within the cavity 16 of pan 10, and in contact with liner 34. After proofing of the dough, the filled pan is then placed within a combination oven 36 (see FIG. 1). The oven 36 is itself conventional, and includes a baking chamber 38 adapted to receive the filled pan 10, and to be closed by door 40. The oven 36 includes conventional heating means such as electrical resistance coil(s) 42 operable to heat the chamber 38 in the usual fashion. In addition, the oven 36 includes one or more microwave or rf energy sources 44 adapted for supplying microwave energy to the baking chamber 38. Those skilled in the art will appreciate that the coils 42 and energy sources 44 are likewise well known and conventional.

Once the filled pan 10 is placed in chamber 38 and door 40 is closed, combination baking can commence. In preferred forms, this involves simultaneous application of convection-type heating via the elements 42 in order to raise the oven temperature, and application of microwave energy. In order to achieve proper baking in reduced time, it has been found that the coils 42 should be operated to achieve an oven baking chamber temperature of from about 430°-625° F., which is higher than conventional bread baking temperatures. Microwave energy at the conventional 2450 ±50 MHz frequency can be used with this conventional baking, in order to produce browned, fully cooked bread in a period of from about 4-15 minutes. Actual testing with a baking pan of the type described and a combination oven produced fully acceptable bread loaves under the following baking conditions: overall baking time of 10 minutes at an oven temperature of 430° F.; 388 watts of microwave radiation at 2450 MHz for 5 of the 10 minutes (minutes 2-7); loaf weight about 455 g.

During baking with the pan 10, microwave energy passes through the top of the pan, and also through the apertures 26, 28, thereby evenly cooking the interior of the loaf. At the same time, the heat conduction qualities of the metal pan walls assures proper browning and crusting of the bread on an accelerated schedule, owing to the increased oven temperatures. The provision of the apertures 26, 28 properly sized to allow passage of microwave or rf energy through the pan walls is critical to success. Comparative tests using otherwise identical, conventional baking pans produces loaves overbaked and dry at the top, and underbaked and soggy at the bottom of the loaf.

While a rectangular in plan configuration bread baking pan is illustrated, it will be understood that pans of various configurations can be employed, e.g., square or circular pans. Similarly, while rigid metallic pans are preferred, disposable foil pans in accordance with the invention can also be employed. Finally, conventional imperforate baking pans now in use may be readily retrofitted by forming appropriately sized and located apertures through the defining walls thereof. Thus, commercial bakers having a store of such conventional pans can readily convert these pans for combination baking in accordance with the invention.

I claim:

1. A baking pan consisting essentially of:
   a metallic body presenting a bottom wall, upstanding, interconnected sidewall structure connected with said bottom wall to define therewith a cavity for receiving a flowable material to be baked,
   said bottom wall and sidewall structure each having a series of apertures therethrough dimensioned to permit passage of microwave or rf radiation therethrough, at least certain of said apertures having a maximum dimension of from about 15-35 mm,
   each of said bottom wall and sidewall structure having a total open area defined by said apertures therethrough which is at least about 20% of the total interior surface area of the respective bottom wall or sidewall structure,
   said sidewall structure having a height of from about 2-4 inches,
   said bottom wall and sidewall structure having a metal thickness of at least about 0.07 mm; and
   a liner disposed within said cavity and covering both said bottom wall and sidewall structure apertures for preventing escape of said flowable material through the apertures, said liner being able to withstand baking temperatures of from about 430°-625° F. while permitting passage of said microwave or rf radiation therethrough and not significantly reducing thermal conductivity through the pan walls.

2. The baking pan of claim 1, said sidewall structure presenting a pair of opposed, generally planar sidewalls and a pair of opposed, generally planar end walls transverse to said sidewalls, said cavity being generally rectangular in plan configuration.

3. The baking plan of claim 2, said end walls being imperforate.

4. The baking pan of claim 1, said apertures being substantially circular.

5. The baking pan of claim 1, said bottom wall and sidewall structure each having a total open area of from about 20-90% of the interior surface area of the respective bottom wall or sidewall structure.

6. The baking pan of claim 1, said bottom wall and sidewall structure being entirely formed of metal and presenting metallic inner and outer faces.

7. The baking pan of claim 1, said pan being disposable, said bottom wall and sidewall structure each having a metal thickness of from about 0.08-0.12 mm.

8. The baking pan of claim 1, said pan being reusable, said bottom wall and sidewall structure each having a metal thickness of from about 0.27-1 mm.

9. The baking pan of claim 1, said liner being formed of disposable baking paper having a thickness of about 0.07 mm.

10. The baking pan of claim 1, said liner being formed of ceramic or toughened glass.

11. The baking pan of claim 1, said body presenting an open top.

12. The baking plan of claim 1, said liner being formed from a material selected from the group consisting of baking paper, toughened glass or ceramic.

13. A combination baking method comprising the steps of:
    providing a baking pan consisting essentially of
    a metallic body presenting a bottom wall, upstanding, interconnected sidewall structure connected with said bottom wall to define therewith a cavity for receiving a flowable material to be baked,
    said bottom wall and sidewall structure each having a series of apertures therethrough dimensioned to permit passage of microwave or rf radiation therethrough, at least certain of said apertures having a maximum dimension of from about 15-35 mm,
    each of said bottom wall and sidewall structure having a total open area defined by said apertures therethrough which is at least about 20% of the total interior surface area of the respective bottom wall or sidewall structure,
    said sidewall structure having a height of from about 2-4 inches,
    said bottom wall and sidewall structure having a metal thickness of at least about 0.07 mm; and
    a liner disposed within said cavity and covering both said bottom wall and sidewall structure apertures for preventing escape of said flowable material through the apertures, said liner permitting passage of said microwave or rf radiation therethrough while not significantly reducing thermal conductivity through the pan walls;
    depositing an amount of said flowable material to be baked in said lined cavity; and
    combination baking said flowable material in an oven, including the steps of heating the oven to a temperature of from about 430°-625° F., and subjecting the flowable material to microwave or rf energy.

14. The method of claim 13, including the step of simultaneously subjecting said flowable material to said heating and subjection to microwave or rf energy.

15. The method of claim 13, including the step of subjecting said flowable material to microwave energy.

16. The method of claim 13, said microwave energy having a frequency of about 2450 MHz.

17. The method of claim 13, including the step of carrying out said combination baking to fully cook the interior of said flowable material while forming a crust on the exterior thereof.

18. The method of claim 13, said flowable material being bread dough.

* * * * *